United States Patent [19]
Meltzer

[11] Patent Number: 5,280,513
[45] Date of Patent: Jan. 18, 1994

[54] X-RAY MICROBALANCE

[75] Inventor: Carl M. Meltzer, Livermore, Calif.

[73] Assignee: Advanced Analytical Products and Services, Mountain View, Calif.

[21] Appl. No.: 790,330

[22] Filed: Nov. 12, 1991

Related U.S. Application Data

[63] Continuation-in-part of Ser. No. 606,639, Oct. 31, 1990, abandoned.

[51] Int. Cl.$^5$ .............................................. G01B 15/02
[52] U.S. Cl. ..................................... 378/90; 378/86; 378/89
[58] Field of Search ..................... 378/86, 88, 89, 90

[56] References Cited

PUBLICATIONS

K. K. Nielson and R. W. Sanders "Multielement Analysis of Unweighed Biological and Geological Samples Using Backscatter and Fundamental Parameters" *Advances in X-Ray Analysis*, vol. 26, p. 385.

Richard J. Arthur and Ronald W. Sanders, "Backscatter/Fundamental-Parameters Analysis of Unweighed Samples Using Multi-Target, Multi-Crystal Regions of Interest From WDXRF and EDXRF" *Pacific Northwest Laboratory (PNL)*, Richland, Wash.

*Primary Examiner*—Craig E. Church
*Attorney, Agent, or Firm*—Townsend and Townsend Khourie and Crew

[57] ABSTRACT

A microbalance and method for measuring the total mass of small quantities of material (mass ranging from about 10 nanograms to about 0.1 gram) using Compton and Rayleigh scattered radiation provides excellent mass measurements for these samples. The apparatus includes a standard radiation generation and detection assembly, including a substantially evacuated chamber through which incident radiation travels, and commercially available radiation generators, power sources, and detectors, having enough spectral resolution to identify the scattered radiation of interest.

8 Claims, 7 Drawing Sheets

X-RAY MICROBALANCE

This application is a continuation-in-part of application Ser. No. 606,639, filed Oct. 31, 1990, now abandoned.

BACKGROUND OF THE INVENTION

This invention is drawn to determining the total mass of very small samples. More particularly, the invention is drawn to absolute total mass determination using Compton and Rayleigh scattered radiation.

X-rays are electromagnetic radiation covering a range of wavelengths from a few hundredths to several tens of nanometers. X-rays are typically produced in sealed high vacuum tubes, where electrons generated from a hot cathode filament, for example, tungsten, are accelerated to a positive metal target anode causing the generation of x-rays. A typical spectral intensity distribution of x-rays emitted from an anode metal includes a series of characteristic lines and an accompanying broad band of radiation called the x-ray continuum or brehmsstrahlung caused by the deceleration of the electron beam in the anode.

As explained in Kirk-Othmer, Encyclopedia of Chemical Technology, Vol. 2, pages 623–634, John Wiley & Sons, New York, 1985, the origin of the characteristic lines are as follows. When the energy of an incident electron is greater than the binding energy of a core shell electron, there is a probability that an interaction between the two may occur such that the bound electron is ejected leaving the atom in an excited state. Electronic relaxation then occurs in which an electron from an outer shell fills the newly created vacancy. This process is accompanied by a release of energy in an amount corresponding to the difference between the initial and final states of the atom. The specific mechanism for the energy release for the purposes of this discussion is the emission of a characteristic x-ray photon. In the case of an initial K shell ionization filled by an L shell electron, the emitted x-ray is called a Ka photon.

One analytical use of x-rays is the determination of composition of samples. In an x-ray fluorescence experiment radiation from a standard x-ray tube is used to excite the atoms of a specimen causing fluorescence which is then analyzed by means of an x-ray spectrometer. As FIG. 1 illustrates, the instrument is composed basically of an evacuated chamber in which a sample 1 is held in a sample holder 2, and an x-ray tube 3 that provides a source of x-rays 4 therein. A collimator 5 operates to collimate the x-rays to produce incident x-ray 6 which impinges on sample 1. X-ray emissions 7 from the atoms of the sample are collimated by collimator 8 into a detector 9. Other components usually include a computing apparatus 10 for generating a spectrum and a power source 11 used to power x-ray tube 3.

Many things can happen to an x-ray as it enters the realm of an atom consisting of electrons and a nucleus. FIG. 2 diagrammatically illustrates the interaction of an electron 12 with an incident x-ray 13 of wavelength $\lambda$ or energy $E=hc/\lambda$, where h is Planck's constant and c is the speed of light. If the energy of incident x-ray 13 is sufficient, it will impart to electron 12 orbiting the nucleus energy large enough to overcome the energy binding the electron to the nucleus. This interaction can occur as if the electron 12 were moving essentially as a free particle and the nucleus did not exist. Billiard ball scattering occurs between incident x-ray 13 and electron 12 in the atom, and this occurs as if the atom were not there. After the collision, the recoiling electron 12 takes up some of the energy of incident x-ray 13, and the scattered x-ray 14 of necessity must have less energy than incident x-ray 13 to account for that gained by the electron 12 as a result of the collision. Because of this loss of energy by the incident x-ray, the process is called "inelastic" scattering, a process discovered by A. H. Compton in 1923, and is also known, therefore, as Compton scattering. This process generally occurs with high energy x-rays with corresponding high energy electron recoil. In the reverse case, where the incident x-ray has low energy and/or very low energy is given to the electron as compared with its binding energy, the process tends to occur not with each electron by itself but with the atom as a whole. The recoil energy is then carried off by the mass of the whole atom rather than just one electron which is kicked out of the atom. This recoil energy is very small for reasonable energy incident x-rays, and the net result is that there is no apparent energy loss to the incident x-ray, i.e., the scattered x-ray has essentially the same energy. This is called "elastic" scattering because there is no apparent energy loss to the incident x-ray, or Rayleigh scattering after its discoverer. Thus, in Rayleigh scattering the interaction of the x-ray is apparently with the whole atom, not just with an electron. Compton and Rayleigh scattering are the two primary forms of scattering that effect x-rays passing through atoms of samples.

Formerly, scatter was regarded only as a nuisance in x-ray fluorescence experiments. Background in these experiments is mostly scattered primary radiation, and both Rayleigh and Compton scatter target lines complicate the emission spectrum obtained from samples and increase the possibility of spectral-line interference. However, scattered x-rays have more recently proved beneficial in many ways. Several analytical methods are based on x-ray scatter rather than emission, including methods for determining carbon in hydrocarbons. See E. P. Bertin, Principles and Practice of X-ray Spectrometric Analysis, Second Edition, Plenum Press, New York, 1975.

It is also known that the Compton scatter cross section (in sq cm/gm), also known as the mass scattering coefficient, will decline by approximately a factor of two from low atomic number (Z) elements (e.g., carbon, Z=6) to high atomic number elements (e.g., lead, Z=82), while the Rayleigh scattering cross-section increases with atomic number (z). However, the Compton scatter cross section is often assumed to be approximately constant at a given energy and scattering angle for the entire periodic table of elements (except hydrogen) in order to not unduly complete the analysis. See for example R. Tertian and F. claisse, Principles of Quantitative X-Ray Fluorescence Analysis, Heyden & Son LTD, London, 1982, pages 30–31.

This dependence of the Compton cross section or scattering probability upon the atomic number is often disregarded, or considered constant; although approximately true, it is not entirely accurate for two reasons. First, the mass scattering coefficient for Compton scattering decreases by as much as a factor of two from low atomic number elements to higher atomic number elements. This trend continues, and becomes greater, as higher atomic numbered elements are encountered. Accordingly, correction must be made for this atomic number dependence of the Compton scattering cross section as a function of the elemental composition of the sample being measured if an absolute measurement of the mass of the sample is to be determined.

Although the relative compositional analysis of samples using Compton scattering is known (e.g., see U.S. Pat. No. 4,117,935), no known device or attempt has been made to use Compton scattering to determine total absolute mass of samples. Previous methods of mass measurement of very low mass in a laboratory setting include hanging a sample attached to a plastic support from a quartz fiber. The rotation of the fiber is indicative of the mass of the sample. Unfortunately, the determination of mass by this method suffers from electrostatic effects on the plastic, and the sensitivity (lowest mass measurable) is only about 0.1 microgram. Also, these prior art microbalances can only tare out about 1 gram. If the sample plus sample holder weighs much more than this, for example, 2 grams, the scale will not be able to determine mass of samples in the microgram range. If the sample holder includes a thin film of plastic upon which the sample is placed, it is not possible to weigh the sample holder and film plus sample, wipe the sample off the film, then weigh the sample holder plus film and obtain a net weight for the sample, since the weight of the sample holder is much higher than the maximum tare weight. In practice, the thin film breaks upon wiping, so that this procedure is not only not possible but also not practical. If a thicker film is used to avoid this latter problem, accuracy is lost because one is then trying to measure mass on the order of micrograms on top of several hundred micrograms of plastic film. Further, the plastic, as mentioned previously, electrostatically charges, affecting accuracy.

Frequently in many scientific disciplines (e.g., geology, mineralogy) it is necessary to know the mass of very small samples (down to 10 nanograms) for normalization purposes, especially if the sample is fairly large in area compared to the area of relatively uniform flux density radiation incident upon the sample, or for calculating the absorption of low energy fluorescent radiation by the sample itself. It would be advantageous if a method and device could be designed which could measure the total mass of very small samples in the range of from about 10 milligrams to about 100 nanograms while avoiding the disadvantages of previous methods.

SUMMARY OF THE INVENTION

It has now been discovered that the total absolute mass of small quantities of material (mass ranging from about 10 nanograms to about 0.1 gram) can be determined using Compton and Rayleigh scattering of radiation in a microbalance using primarily commercially available components. The apparatus comprises a standard radiation generation and detection assembly and means for holding the sample in the path of the incident radiation. The standard radiation generation and detection assembly includes a substantially evacuated chamber through which incident radiation travels. The radiation generated uses commercially available radiation generators and power sources. The detectors useful in the practice of the invention are also generally commercially available. Preferably, the radiation source and detector are as close as possible to the means for holding the sample and therefore the sample to reduce the probability of missing the scattered radiation. The detector must have enough spectral resolution to identify the scattered radiation of interest, both Compton and Rayleigh scattered radiation for the present invention. The assembly also includes standard incident and scattered radiation collimators, electrical components for operating the source and detector, computing means for building up a spectrum of scattered radiation from the sample of interest, and means for trapping stray incident radiation.

According to the method of the present invention, the mass of samples having mass in the above range is determined by broadly first measuring the Compton and Rayleigh scattered radiation from the means for holding the sample; next, the second step is performed, comprising measuring the Compton and the Rayleigh scattered radiation from the same means for holding the sample as the first step, with the sample placed thereon; the third step comprises calculating the net Compton and Rayleigh scatter from the sample by subtracting the Compton and Rayleigh scatter found in step one from the Compton scatter found in step two; fourth, the absolute mass of the sample is calculated, using measured Compton scattered values, corrected for atomic number dependence using the measured Rayleigh scattered value; fifth, a reiterative calculation is made to again correct for absorption by the sample (and holder means) of incident and scattered radiation; and, finally, the total absolute mass of the sample is determined by dividing the corrected Compton scatter by a calibration constant previously determined, which converts the net scatter (typically in measured counts per second (cps)) into a mass in the range of nanograms to a tenth of a gram.

The determination of total absolute sample mass of samples having mass in this range by using a device dedicated to measurement of Compton and Rayleigh scattering has heretofore never been attempted to the knowledge of the inventor. Further advantages to this method and apparatus will be described with reference to the accompanying drawings, of which the following is a brief description.

DESCRIPTION OF PREFERRED EMBODIMENTS

The present invention is drawn to an apparatus and method for using the apparatus, to measure the absolute mass (weight) of a sample whose total mass preferably lies in the range of from about 10 nanograms to about 0.10 gram, particularly in the range of from about 100 nanograms to about 10 milligrams. The device operates by measurement of the intensity of radiation, preferably x-rays from an x-ray tube, which is inelastically (Compton) scattered by the electrons in the atoms which constitute the sample. Measurement of the sample mass by this process is sufficient if one is willing to accept the consequences (i.e., error between measured mass of the sample and its absolute mass) of assuming that the Compton scatter cross section (in sq cm/gm) remains approximately constant at a given energy and scattering angle for the entire periodic table of elements, except for hydrogen, and that there is essentially zero absorption of both the incident and scattered radiation by samples in the mass range to be measured. To the inventor's knowledge no other use of the Compton scattering process to determine the total absolute (as opposed to relative) mass of a sample has been made.

One reason such measurements have not been made in the past is that x-ray fluorescence has been used historically to determine the composition of large (several grams) samples which are infinitely absorbing in most cases for both the incident, fluorescent, and scattered radiation. The use of Compton scattering to determine the mass of extremely small samples is a consequence of the small total sample mass involved.

However, inelastic sample-scattered incident radiation cross section is not constant from low atomic number elements to higher, resulting in mass measurements not quite accurate. It has been found, however, that the elastic (Rayleigh) scattered radiation, which varies with element atomic number opposite to that of inelastic scattering, can be used to compensate the change of Compton scattering probability with the atomic number of the sample.

Another source of error flows from the failure to account for absorption by the sample of both incident and scattered (elastic and inelastic) radiation. While it is believed that this error is negligible for low mass samples (e.g., less than 1 mg), it can be significant for samples of a larger mass (e.g., greater than 1 mg).

Figure 1:
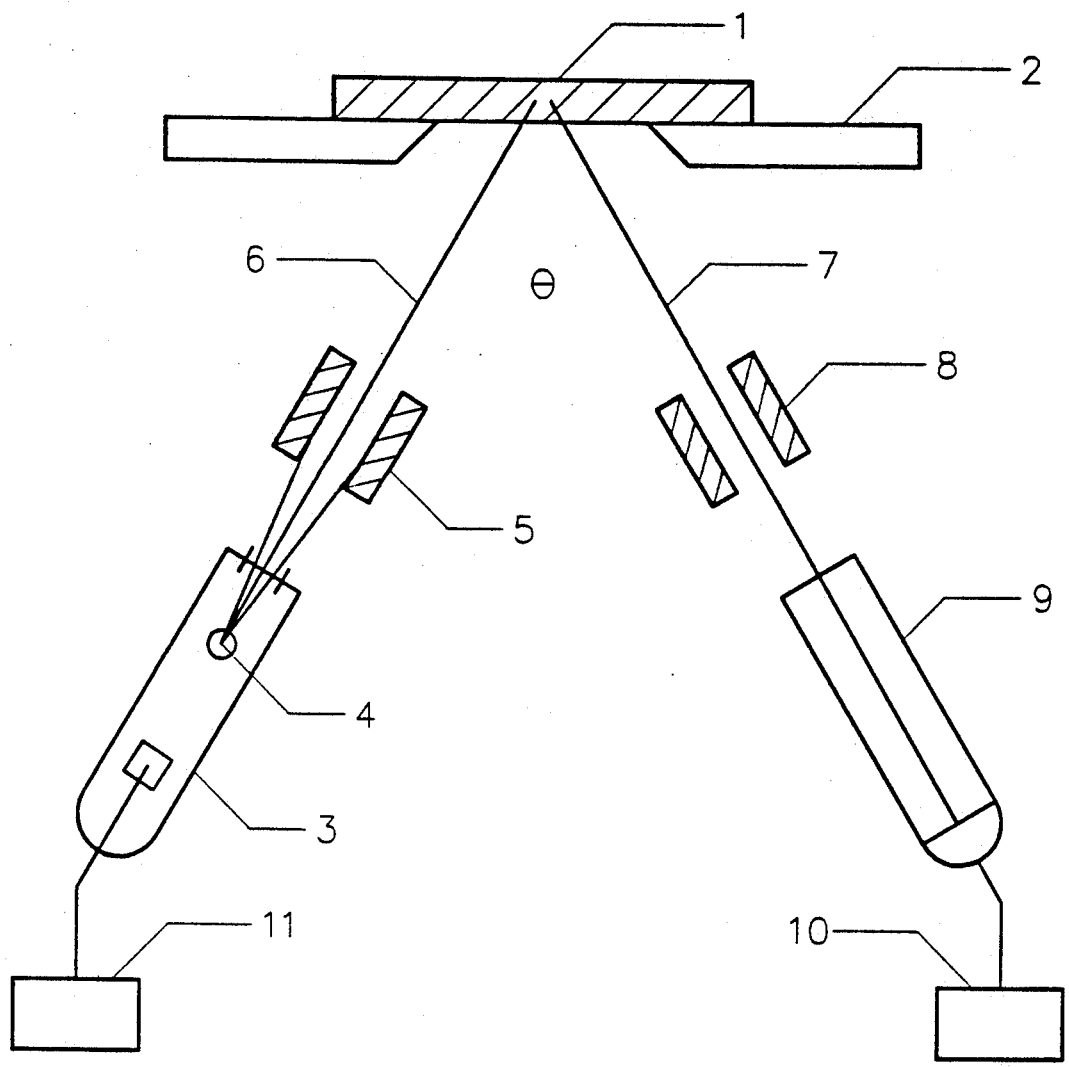
FIG. 1 is a schematic diagram of a standard x-ray fluorescence device.
Figure 2:
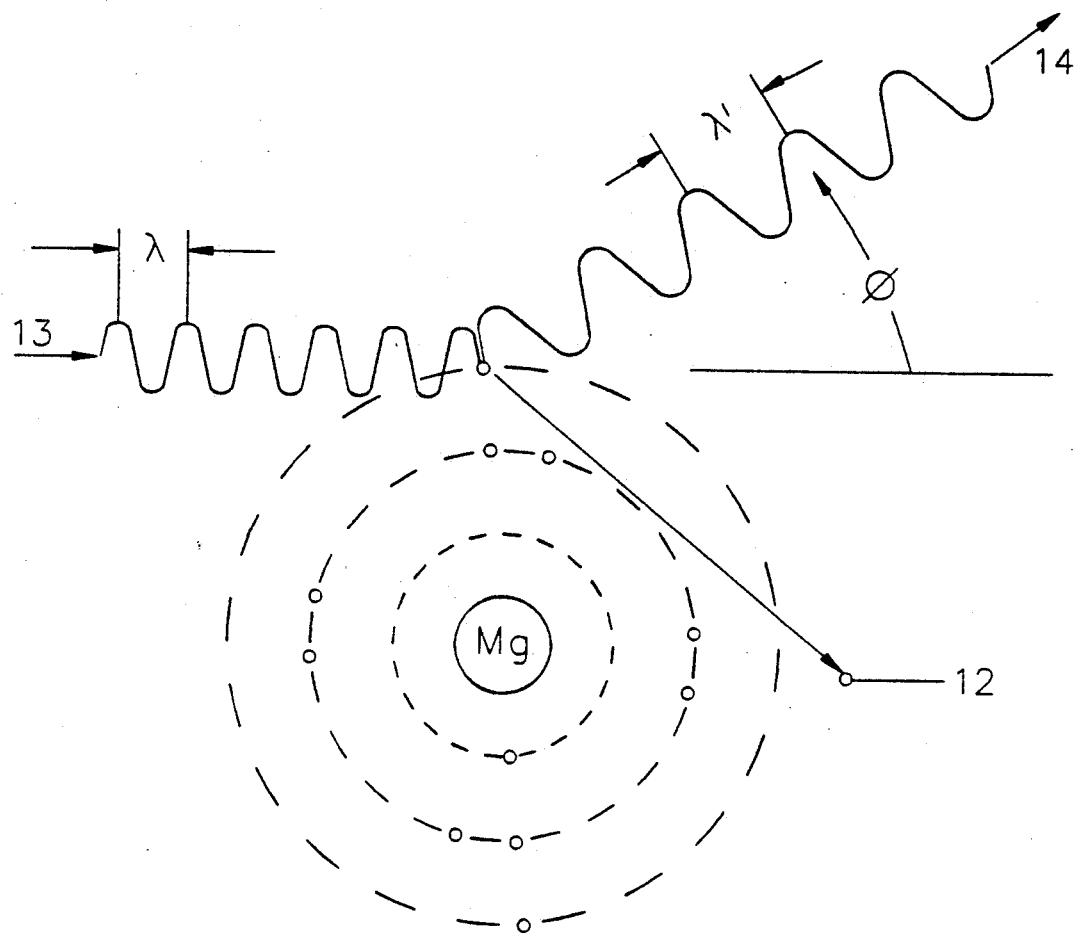
FIG. 2 is a schematic diagram showing the interaction of an x-ray photon with an electron in Compton scattering.
Figure 3:
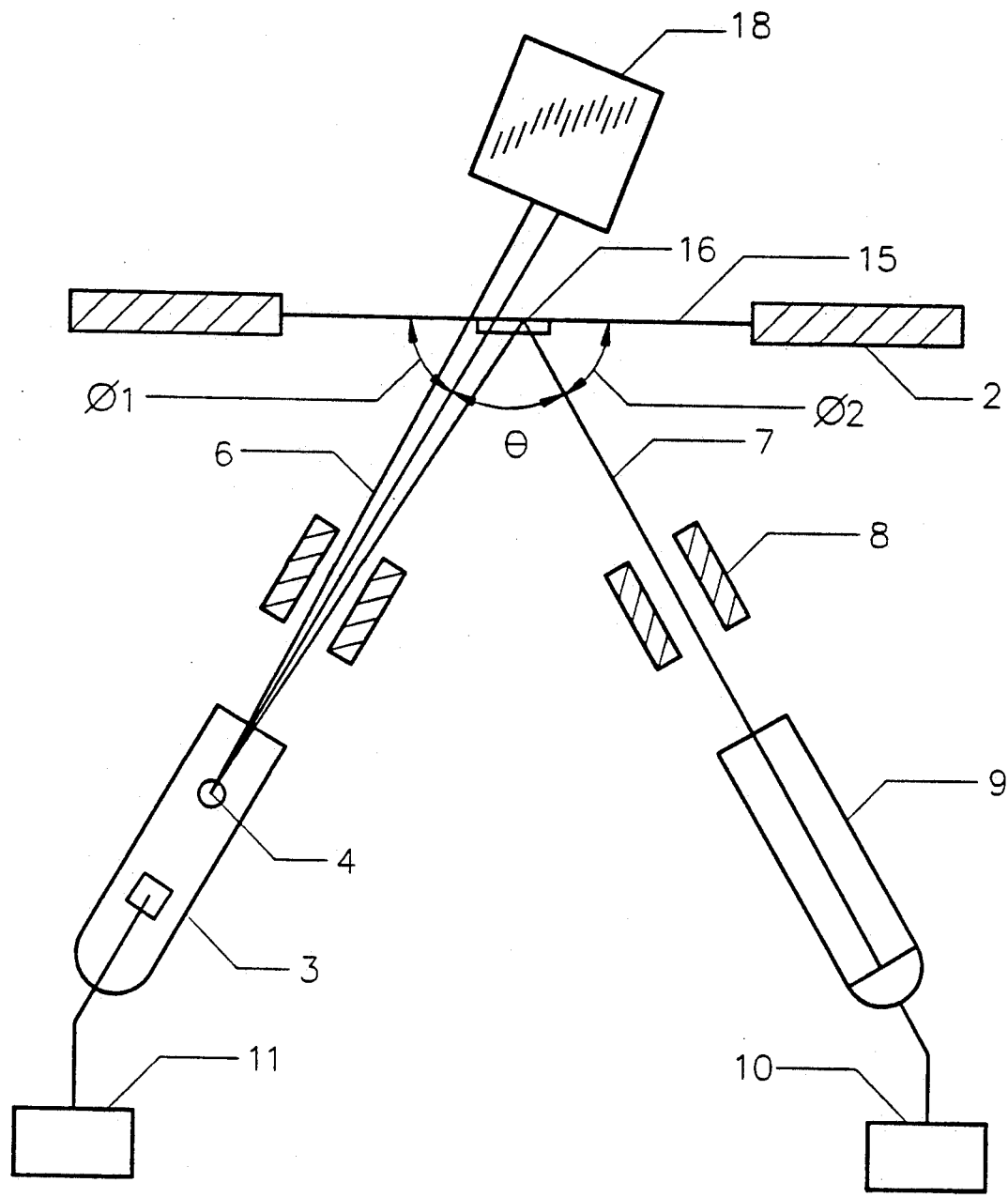
FIG. 3 is a schematic diagram similar to FIG. 1 showing one embodiment of a sample holder in accordance with the present invention.

One preferred embodiment of an instrument in accordance with the present invention is shown schematically in FIG. 3. The instrument has components similarly numbered as those illustrated in FIG. 1, with the sample 16 and sample holder 2. As FIG. 3 shows, a conventional x-ray tube 3, powered by a power source 11, includes a source 4 for producing incident x-rays 6. The collimator 5 collimates the x-rays 6, directing them toward the sample 16 carried by the holder 2.

Scattered x-rays 7 are collimated by the collimator 8 and received by detector 9. The detector 9 connects to a computing apparatus 10 by appropriate electronics (e.g., analog-to-digital conversion devices) known to those skilled in this art. Information from the detector 9 is gathered by the computing apparatus 10 where the necessary calculations are made, as hereinafter described, to determine the absolute mass of the sample 16.

Figure 4:
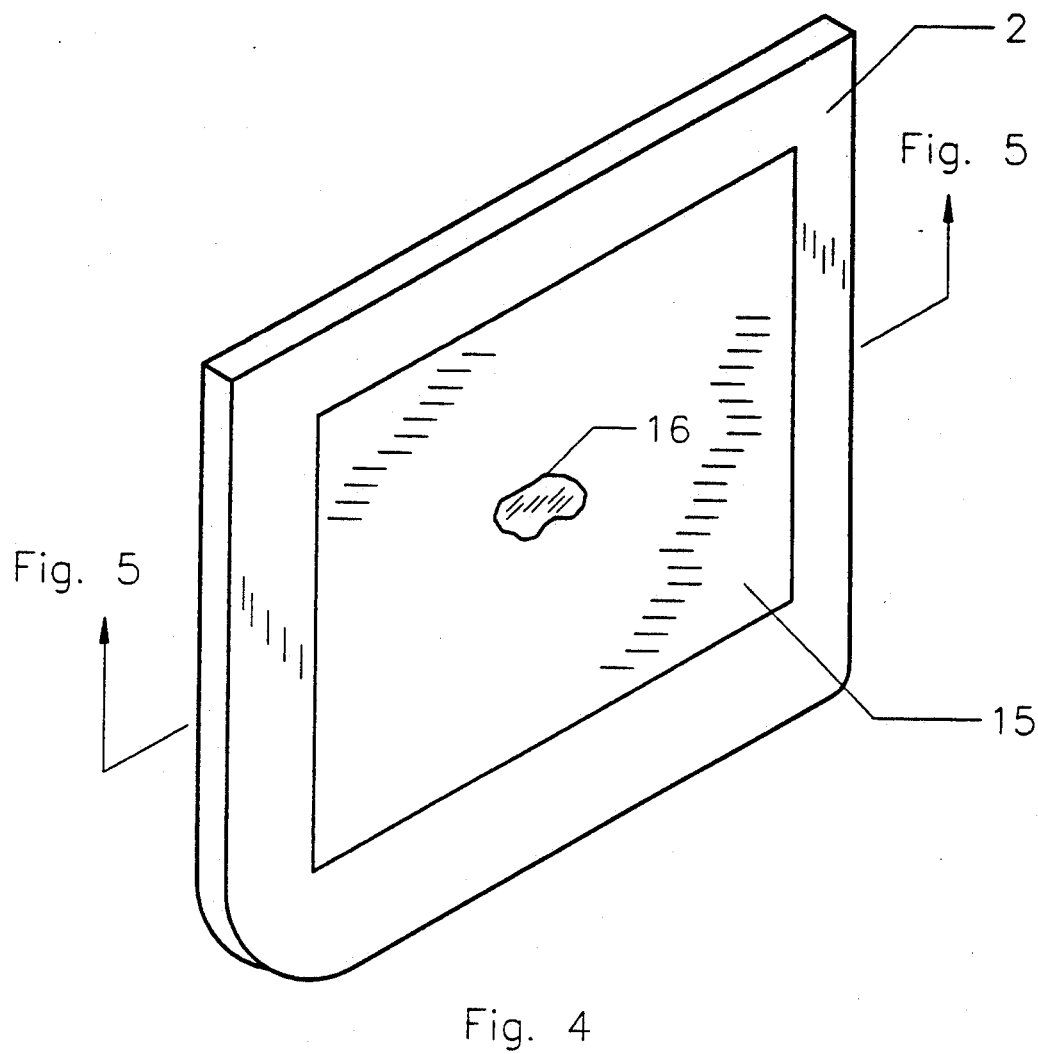
FIG. 4 shows a perspective view of the sample holder of FIG. 3, showing the sample deposited on a film.
Figure 5:
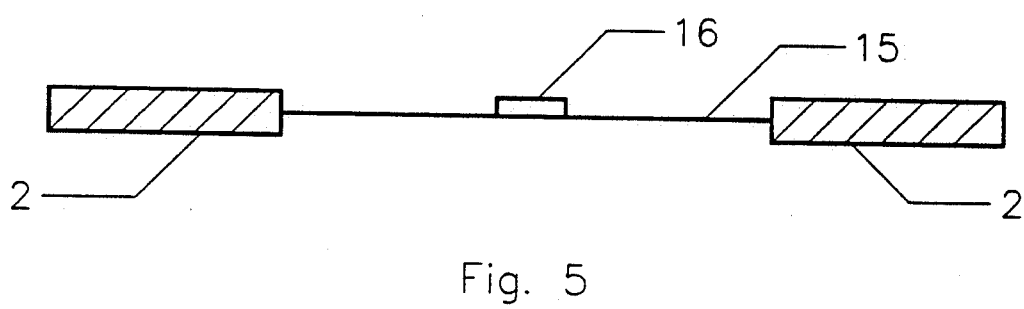
FIG. 5 is a cross-sectional view of the sample holder of FIGS. 3-4.

FIGS. 4 and 5 illustrates the sample holder 2 in greater detail, showing it as including a frame constructed to surround and hold a film 15, upon which a sample 16 is placed. The sample area is generally circular, having a measurable diameter ranging from about 0.05 inch to about 0.35 inch. The source 4 (FIG. 3) and detector 9 should be as close to sample 1 as possible to increase the efficiency of detector 9. The distance from sample to source and detector preferably ranges from about 0.5 inch to about 2 inches. The embodiment shown in FIG. 3 has the distance from sample 16 to source 4 and detector 9 of about 1 inch. Preferably, the angles $\phi_1$ and $\phi_2$ are substantially 45 degrees to compensate for the sample 16 not having every location the same distance from the source and detector. In other words, the fact that the one side of the sample 16 (e.g., the left side as viewed in FIG. 3) is closer to the source 4 than the other (e.g., right) is substantially compensated for by the right hand side of the sample 16 being closer to the detector 9. A cross sectional view of the sample holder 2 of FIG. 4 is shown in FIG. 5 with the sample 16 shown greatly exaggerated in size.

Figure 6:
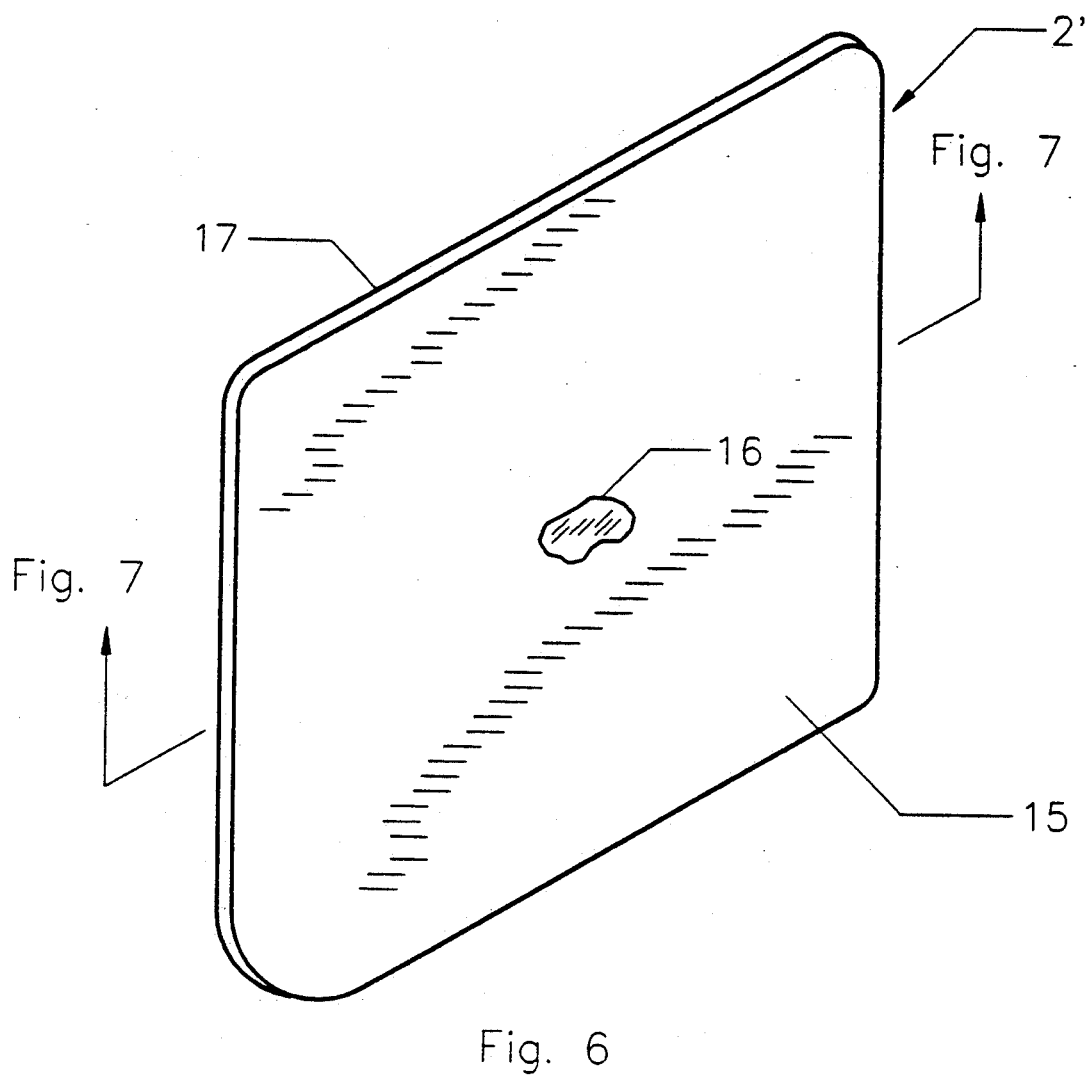
FIG. 6 is a perspective view of another embodiment of a sample holder in accordance with the present invention.
Figure 7:
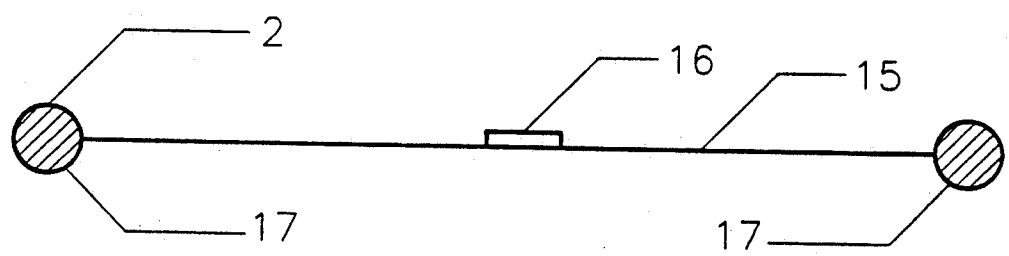
FIG. 7 is a cross-sectional view of the sample holder of FIG. 6.

Another embodiment of a sample holder, designated generally with the reference numeral 2', is shown in perspective in FIG. 6, and in cross section in FIG. 7. The sample holder 2' is formed from a metal wire frame 17 with the film 15 and sample 16 substantially as shown in FIG. 4. It should be pointed out that film 15 in all embodiments need not entirely span the sample holder 2', especially if the film is extremely thin or decays significantly under drying conditions.

The radiation source 4 is preferably a commercially available x-ray tube such as, for example, those manufactured by the Kenex Corporation of San Carlos, Calif., or Trufocus Corporation of Los Altos, Calif., although other radiation sources are considered within the invention. Electrons generated form a hot filament such as tungsten are accelerated to a positive metal target anode, preferably rhodium, causing the generation of x-rays. X-rays emerge from the tube typically through a thin beryllium window.

Many different types of radiation are produced by the sample under these conditions: Compton scattered (x-ray) radiation, Rayleigh scattered (x-ray) radiation, fluorescence lines emitted by the elements in the sample, etc. This radiation is emitted and scattered in many directions. In the case of the scattered radiation, the scattering angle $\Theta$ is shown, and is determined by the geometry of the instrumentation orientation.

Fairly monochromatic x-rays can be obtained by selecting appropriate absorption filters. For example, a rhodium anode x-ray tube may be filtered by a copper foil (approximately 0.002" thick) to reduce the brehmsstrahlung spectrum below the characteristic rhodium K lines. A second filter layer of aluminum foil (approximately 0.010" thick) could then be used to remove copper K lines from the first. The x-rays are then collimated to restrict x-ray flux to the vicinity of the sample.

The detector 9 is preferably of the type having a sufficient spectral (energy) resolution to detect scattered radiation from the sample and to enable the associated electronics and computer programs to recognize which of the incoming x-rays are scattered x-rays, i.e., it absorbs x-rays and puts out a signal for each x-ray whose amplitude is proportional to the energy of the x-ray. More preferably, the detector 9 can also detect Rayleigh scattered x-rays, for purposes explained in more detail hereafter. Thus the instrument has some spectroscopy capability built in. What is important is that the detector produce one output signal for every x-ray detected and that it have spectral resolution for the amplitude of the signal produced. This amplitude is proportional to the energy of the x-ray that was absorbed. Detector 9 is preferably either a proportional gas counter or a scintillation counter, both commercially available. For producing spectral diagrams a more expensive SiLi detector may be used which has higher resolution. Whatever detector is used should be able to produce high resolution spectra (histograms) of counts per second (cps) vs. energy (KeV) for the scattered radiation of interest. Preferably the detector will be positioned so that about 100,000 x-rays per second enter the detector for the largest samples.

The apparatus 10 is typically a data processing computer having sufficient storage capacity to accumulate the data points detected by detector 9. The amplitude of each individual signal is the analog of a specific memory address in the computer. The signal then passes through an analog/digital converter to produce a digital number associated with the memory address. A spectrum is thus built up over time comprising a plot of energy of x-rays detected vs. the number of x-rays detected over a specific time period, usually on the order of 300 seconds. Each energy is indicative of a given element. In this particular device and method the instrument operator is interested in the counts per second (cps) at the energy associated with the Compton scattered line of the x-ray tube anode material. The electrons generated in the tube slam into the anode of the tube creating a broad spectrum of radiation called the brehmsstrahlung spectrum, but in addition excite characteristic x-ray fluorescence from the anode material.

The source 4 will typically include an x-ray tube anode material formed from rhodium, although other materials with known characteristic lines may be used. When rhodium is used, the Compton scattered rhodium K line shows up in the spectra at about 19 KeV. In other words, the rhodium x-rays come from the source 4 and are scattered by the sample 16 (plus whatever the sample is sitting on) into the detector 9. In Compton scattering, the energy loss by the x-ray is a function of the scattering angle, so that there is an angular range of scattered x-rays that get into the detector 9. This, plus the finite energy resolution of the detector 9 is what produces the Compton scattered x-ray peak in the spectra. The energy resolution of the detector 9 is much narrower than the width of the peak, meaning that most of the x-rays are coming from the angular range of scattering angle that is being detected.

An optional trap 18 (FIG. 3) may be used for safety reasons: to capture stray radiation. Although not required to operate the instrument to determine total mass of samples 16, it is highly recommended for safety. The trap 18 may comprise a "honey-comb" of lead where all of the radiation that did not interact significantly with the sample 16 or sample support 2 (or 2') are lost. If the radiation is not scattered from the sample 16, ideally the operator wishes the radiation to disappear into a "black hole", such as a block of lead having many holes with some depth to it, so that radiation such as unscattered x-rays enter the trap 18 and start interacting so that the probability of the x-rays returning from the trap along their entry paths is very small.

Generally, it is important that very little, if any, material be in the path of any of the x-rays in the instrument (FIG. 3) other than the sample itself. Thus, the preferred embodiments of the device operate with an evacuated chamber to prevent air molecules, dust particles, etc. from scattering the x-rays, the vacuum being at least below about 1000 microns Hg.

An extremely important aspect of the present invention lies in the sample holder 2 design. For the same reason that air is substantially eliminated, it is particularly desirable that the sample holder 2 or 2' be low in mass and thin to allow incident radiation 6 (FIG. 3) that does not interact with the sample 16 to pass through the sample holder 2 and become lost in the trap 18, so that it does not reach detector 9. In light of these aspects, the preferable sample holder 2 (FIG. 4) is a 35 mm slide mount, as shown more clearly in perspective in FIG. 4. Mounted in the slide is a film 15 specifically designed to hold samples in the mass range where x-ray fluorescence analysis is most useful, i.e., total sample mass ranging from about 10 nanograms to about 0.1 grams, more preferably ranging from about 10 nanograms to about 10 milligrams.

Film 15 is preferably hydrocarbon polymer material formed to have a thickness ranging from about 200 Angstroms to about 2.0 microns, but preferably in the range of 800 Angstroms to about 1.5 microns. Ideally, as discussed above, the film would have as small a thickness dimension as possible. Films of this thickness have irradiated masses ranging from about 3 micrograms to about 150 micrograms, more preferably from about 5 micrograms to about 110 micrograms. Any polymer film having low mass per unit area, low effective Z, and random structure is preferable. Exemplary film materials are polycarbonate, alkyd or vinyl polymers in solution form into which the slide mount is dipped. Suitable alkyds include polyalcohol-phthalic anhydride esters, resinoids, resins, and resin mixtures (e.g. Avlin, Dacron, Dulux, Duraplex, Encron, Esterol, Fortrel, Glyptal, Mylar, and Terylene). Vinyl polymers include polyvinyl acetate (e.g. Alvar, Vinylite); polyvinyl acetate and vinylidene dinitrile, or nytrile (e.g. Darvan); polyvinyl alcohols (e.g. Vinal); polyvinyl aldehydes (e.g. Formvar); polyvinyl chloride (e.g. chloroprene, Geon, Korolac, Plioflex, Tygon); polyvinyl chloride and acetate (e.g. Elastiglas, Vinyon); and polyvinylidene (e.g. Saran). Particularly preferable are Mylar and Formvar, each commercially available. Formvar may be purchased commercially as a 2% liquid solution of a polyvinyl aldehyde in dichloroethane. A drop of the solution is cast upon the surface of water and spreads out into a very thin film. The dichloroethane evaporates and a film of the plastic is formed floating on the water surface, which may be picked up by a slide mount as shown in FIG. 4. Mylar films may be purchased in rolls or sheets.

The method of using Compton and Rayleigh scattering by a very small mass sample to determine that sample's mass is straightforward once sample holders as described above have been produced. The method is best described with reference to the following example. The data of the example was obtained using a model 0700 x-ray fluorescence spectrometer manufactured by Kevex Corporation of San Carlos, Calif.

EXAMPLE OF MASS MEASUREMENT

Since the mass/thickness of the films formed in the manner described is not very reproducible, the first step was to determine the Compton scattered radiation from the film itself. Table 1 lists U.S. Geological Society (USGS) samples of known mass and dissolved solids content (ppm) used in various mass measurements on Formvar films. For example, USGS M104 has dissolved solids content at 140 deg F. of 629 ppm, with standard deviation of 3 ppm. Various sample loadings are then listed (e.g. M10dE, M104eF, etc.), where the "d" and "e" represent different sample drops, and the "E" and "F" represent different Formvar films. The net liquid sample mass is shown, with the corresponding calculated dried sample mass in micrograms. The 35 mm photographic slide mount as shown in FIG. 4 having film 15 (without sample 16) labeled FMV1005A was placed in the machine as shown in FIG. 3, a vacuum drawn on the system, and power source 11 activated. The rhodium anode tube was operated at potential of 50 KV at 2.0 mA current. The x-rays were filtered by a copper film to reduce the brehmstrahlung spectrum below the characteristic rhodium K lines. A second filter layer of aluminum was used to remove copper K lines produced in the first filter. Compton scattered x-rays from the film were detected by detector 9 over a period of time, about 150 seconds. As described above, each scattered x-ray produced a signal or count, and the counts per second were thereafter calculated. The non-sample count rate for an approximately 800 Angstrom Formvar film was measured to be 24.9 cps. The effective irradiated mass of the film was about 5 micrograms.

The film and holder were then removed from the machine, and immediately thereafter 26.8 milligrams of a water sample (M106dA) was applied to the film and evaporated to dryness at room temperature. The sample mass to be measured was the dried residue from the water sample. From other measurements it was known that water sample M106 had 103 ppm dissolved solids, and that therefore the expected mass of the solids should be $26.8 \times 103 \times 10^{-6} = 2.76$ micrograms. This is a check on the mass to be determined.

Figure 9:
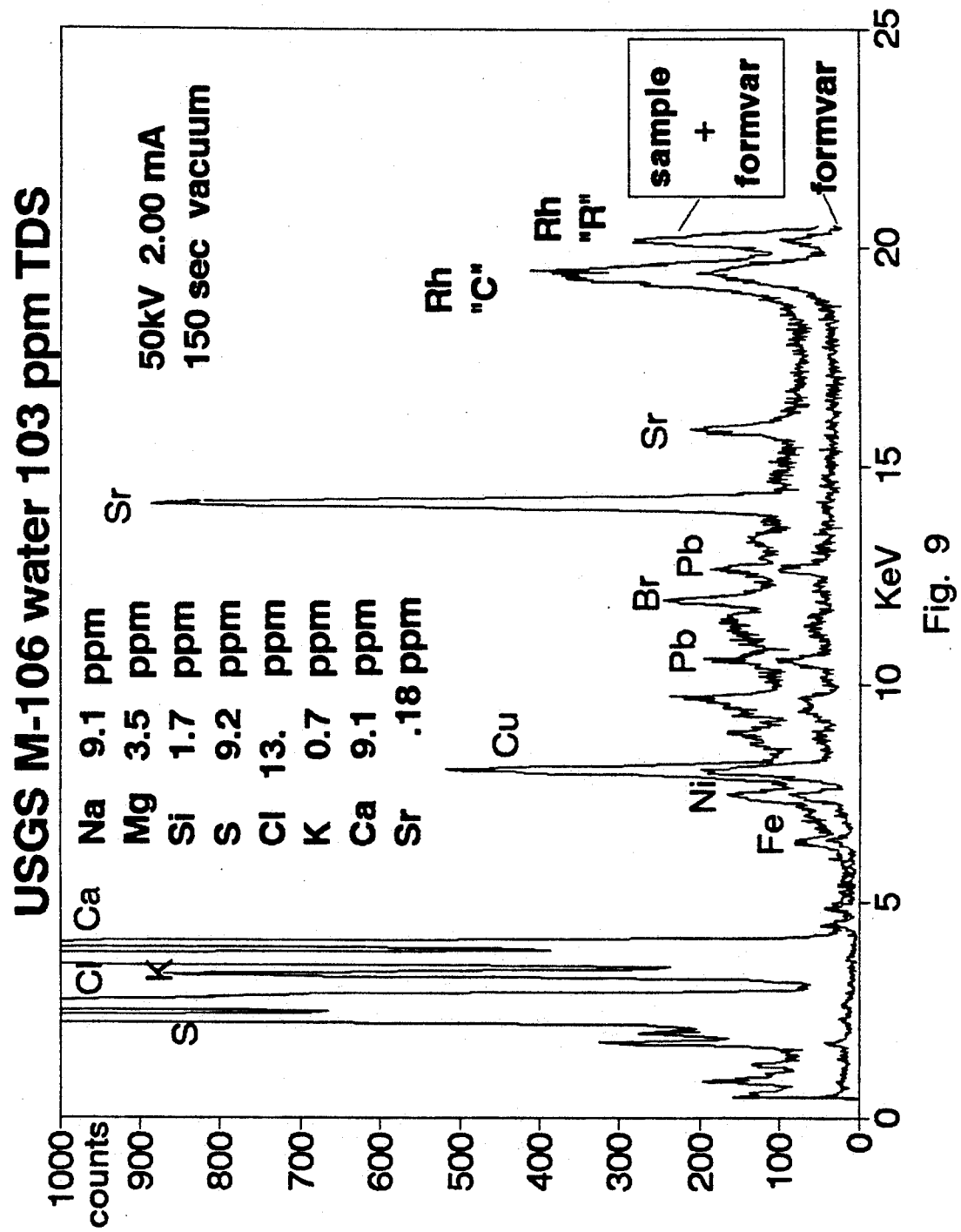
FIG. 9 shows sample and film spectra generated using the device and method of the present invention.

The sample plus sample holder and film were then placed in the machine and the Compton and Rayleigh scattered peak intensities from the sample and same film were measured from spectra in FIG. 9. Table 2 lists these measurements, which for M106dA were 43.8 cps and 23.1, respectively. (Table 2 lists "Compton" and "Rayleigh" in quotations because these measurements actually include other background.) The net Compton scattered x-rays from the sample M106dA was then determined to be $43.8 - 24.9 = 18.9$ cps. The mass of the sample is then determined by dividing the result by the appropriate calibration constant required to convert cps to micrograms. In this case the calibration constant is the average value of the ratio of measured Compton scattered peak intensity produced from a sample of known mass to the mass of the sample for a set of samples of known mass. The average Compton cross section was determined empirically by measuring the Compton scatter peak intensity for a range of samples shown in Table 2 of known dried mass, dried on a watch glass in the same manner as the dried Formvar mounted samples. A standard laboratory balance is then used to get the mass of the residues. For the machine configuration used this was determined to be 2 mA $\times$ 3.65 cps/ma/microgram = 7.30 micrograms/cps. The total dissolved solids measured mass for sample M106dA is then $18.9/7.30 = 2.59$ micrograms (Table 3).

Tables 4-6 present data on samples run on 1.5 micron Mylar films.

The variation between expected and measured masses may be attributed to various factors: the machine may not be running exactly the same way for successive scattering measurements; the Formvar film is not exactly uniform; the position of the slide in the machine must be centered, however the film where the sample drop is dried may not be the exact spot where the film scattering was measured; and the samples used to determine the Compton scatter cross section in the appropriate units may not have dried the same way as the Formvar supported samples as assumed. When using films with liquid samples that attack the film during the drying process, it may be necessary to dry the sample at room temperature, and/or buffer the either the sample or the film to resist attack of the film at elevated temperatures. These techniques have worked with Formvar films with some success.

The combination of the above described sample size and holder with the relative constancy of the Compton scatter cross section at a given scattering angle for the entire periodic table of elements submits a relative measurement of the total mass of samples in these sample sizes. No absorption correction was made since it is believed that samples of this size will not absorb to an extent that will significantly affect mass determination. For larger samples, however, absorption correction is made in a manner described hereinafter. Compton scatter cross section, as used herein, is literally the probability that an x-ray incident on a sample will be Compton scattered, per unit mass of sample. For example, 100,000 incident x-rays per second on irradiating a sample having a Compton scatter cross section the equivalent of 1%, this means that 1000 of the incident x-rays will be Compton scattered. It is a measure of the probability of the Compton scatter occurring.

Figure 8:
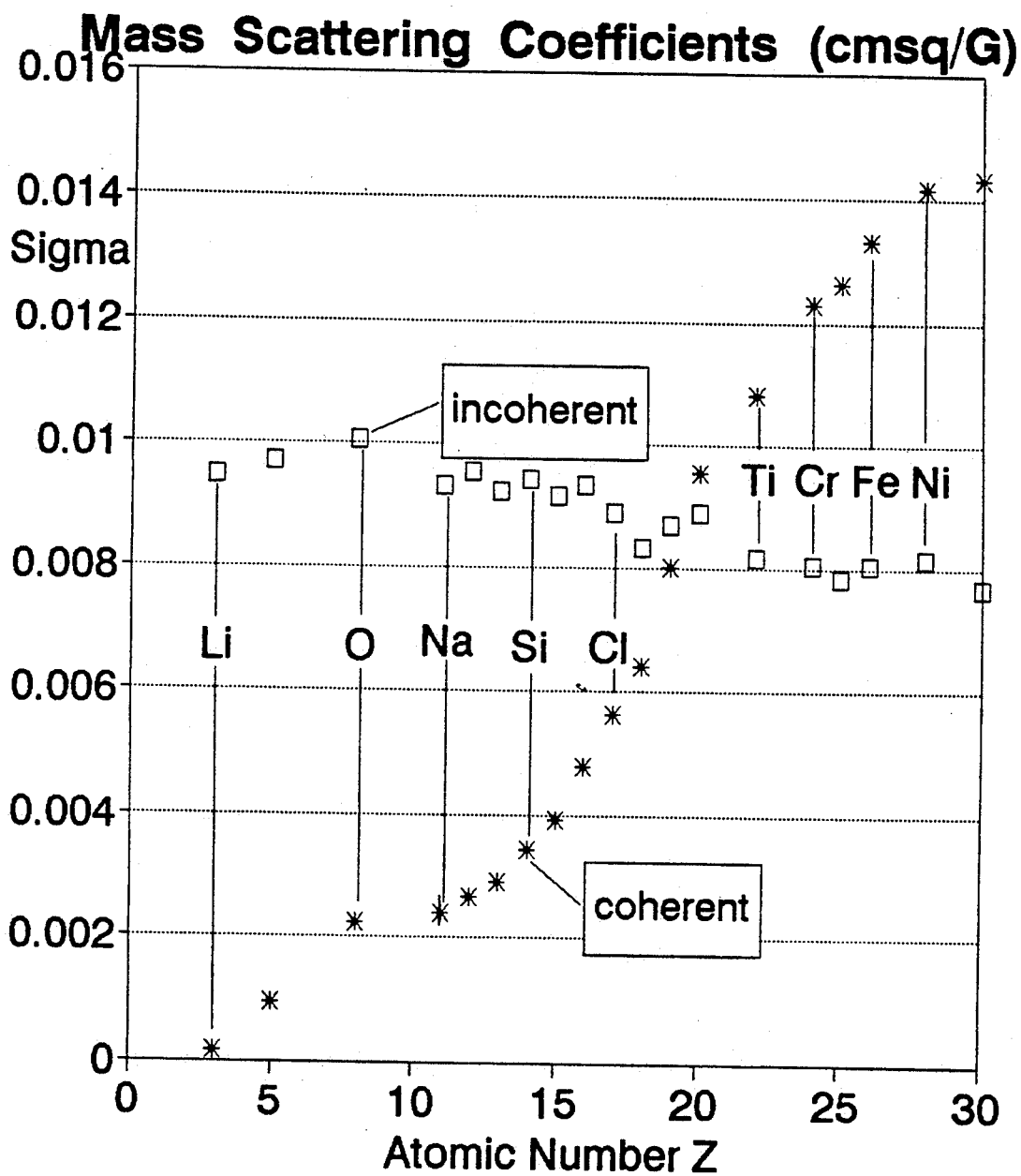
FIG. 8 shows how the Compton and Rayleigh scatter cross sections vary with atomic number Z.

Rayleigh scattering, on the other hand, which, as indicated above, increases proportionately with the square of Z (atomic number). (See FIG. 8, from Tertian and Claisse, which shows incoherent and coherent mass scattering coefficients as a function of atomic number for Ag K$\alpha$ radiation and scattering angle of 90°.) This information may be used to correct the mass determination, which is based on the assumption that Compton scattering cross section is constant. The following relation is useful:

$$\text{Corrected Mass} = CC^* Ic^* (1.0 + 0.2^* (Ir/Ic)^2) \quad \text{Eq. (1)}$$

Where,

Corrected Mass is the net mass of the sample to be determined;

CC is a calibration constant that is determined by measurement samples of known mass (In theory, this constant depends upon such physical parameters as the type of equipment or apparatus used such as the operating characteristics of the x-ray tube 3 and the detector 9 (FIG. 3), the location of the tube and detector relative to the sample, etc. In practice the calibration constant is empirically calculated by methods well known to those skilled in this art.);

Ic is the net incident radiation Compton scattered by the sample, and is equal to the total incident radiation Compton scattered by the sample and sample support minus the previously measured or calculated incident radiation Compton scattered by the sample alone; and Ir is the net incident radiation Rayleigh scattered by the sample, obtained in the same fashion as that described for the Compton scattered radiation.

Equation 1 produces a value ("Corrected Mass") that is corrected for the Compton scattering cross section not being constant over the periodic table.

This correction, however, ignores the explicit treatment of the effects due to absorption of incident x-ray radiation, and Compton and Rayleigh scattered incident radiation by the sample itself. Absorption by the sample reduces the intensity of the measured Compton and Rayleigh scattered radiation and, therefore, leads to an underdetermination of the mass of the sample being measured.

The intensity of radiation of an energy E by a sample of density rho and thickness t is attenuated according to the following formula:

$$Ic/r(E,t) = I(E,O) * e^{-(mu/rho) * rho * t} \qquad \text{Eq. (2)}$$

Where,

Ic(E,t) is the Compton scattered intensity of radiation of energy E incident upon the sample; Ir(E,t) is the intensity of the Rayleigh scattered radiation, I(E,O) is the intensity of radiation of energy E incident upon the sample; and mu/rho is the absorption probability (units are centimeters square per gram) for radiation of energy E by the sample. This probability is a function both of the radiation energy E and the composition of the sample.

The density is obtained from the mass of the sample (unknown at this point) divided by the volume of the sample which is equal to the product of the area (A) and its thickness (t). Using these relationships, an iterative calculation can be used to correct the calculated value of mass for the absorptive effects of the sample. The iterative process proceeds as follows:

1. The sample is irradiated with x-rays to obtain the measured values Ic and Ir, which was then used in equation 1 (above) to obtain the Corrected Mass.
2. An estimate of the product rho*t is obtained by dividing the Corrected Mass by the area of the sample.
3. Next, the absorption probability (mu/rho) for the sample is estimated from $mu/rho = 8.4*(Ir/Ic)^2$.
4. The absorption probability (mu/rho) so obtained is then used, with the Corrected Mass, in equation 2 to obtain a further determined value of the mass of the sample that accounts for absorption. If the difference between the first corrected sample, incident and scattered x-ray, and that obtained by steps 1–3 are within an acceptable margin of error, the calculation stops. If not, the calculations of steps 1–4 are performed once again, and continued until the difference between the corrected sample obtained prior to running through steps 1–4 and that obtained last running through steps 1–4 are within the acceptable margin of error.

Since the Compton scatter cross section varies by approximately a factor of 2 over the entire periodic table of elements, and since most samples contain the lighter elements, only slight correction of the assumption produces very accurate absolute mass determinations.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims. For example, a completed machine in accordance with the present invention will generally include electronic components for operating the radiation power source, radiation source, detector, and the computer used for building the spectrum of scattered radiation.

TABLE 1

SAMPLES OF FORMVAR

| Names | Materials Used Dissolved Solids (ppm) (at 140 deg F.) | |
| --- | --- | --- |
| USGS M104 | 629 | (3) |
| USGS M106 | 103 | (4) |
| USGS M108 | 1457 | (6) |
| USGS M112 | 112 | (3) |
| USGS M114 | 211 | (2) |

| Label | Samples Analyzed Net Liquid Sample (milligrams) | Calculated Dried Mass (micrograms) |
| --- | --- | --- |
| M104dE | 19.3 | 12.1 |
| M104eF | 37.1 | 23.3 |
| M104fG | 13.3 | 8.36 |
| M106dA | 26.8 | 2.76 |
| M106eB | 17.8 | 1.83 |
| M106fC | 33.3 | 3.43 |
| M108dM | 18.8 | 27.4 |
| M108eS | 27.4 | 39.9 |
| M108fH | 36.5 | 53.2 |
| M112dD | 27.8 | 5.43 |
| M112eI | 16.9 | 3.30 |
| M112fX | 36.7 | 7.17 |
| M114dU | 24.8 | 5.24 |
| M114fP | 43.2 | 9.13 |

TABLE 2

SPECTRAL DATA
(150 sec acquire time, 50 kV, 2.0 mA, vacuum)

| Sample | Mass | "Compton" Total | Net cps | "Rayleigh" Total | Net cps |
| --- | --- | --- | --- | --- | --- |
| M104dE | 12.1 | 144 | 101 | 86.2 | 69.2 |
|  |  | 142 | 98.7 | 83.8 | 66.8 |
| M104eF | 23.3 | 229 | 177 | 129 | 111 |
| M104fG | 8.36 | 132 | 68.6 | 66.7 | 43.8 |
| M106dA | 2.76 | 43.8 | 18.9 | 23.1 | 12.9 |
|  |  | 43.5 | 18.6 | 23.3 | 13.1 |
| M106eB | 1.83 | 48.1 | 16.2 | 22.5 | 9.90 |
| M106fC | 3.43 | 56.8 | 25.7 | 27.9 | 15.9 |
| M108dM | 27.4 | 229 | 183 | 161 | 143 |
|  |  | 228 | 182 | 167 | 149 |
| M108eS | 39.9 | 307 | 265 | 228 | 211 |
| M108fH | 53.2 | 384 | 351 | 283 | 270 |
| M112dD | 5.43 | 69.2 | 38.9 | 44.1 | 31.8 |
| M112eI | 3.30 | 67.9 | 27.3 | 33.6 | 18.5 |
| M112fX | 7.17 | 80.8 | 53.6 | 50.8 | 39.8 |
| M114dU | 5.24 | 70.3 | 36.9 | 42.5 | 29.6 |
| M114fP | 9.13 | 105 | 63.2 | 60.0 | 44.0 |

Average Conversion Factor From Net Compton cps to Sample Mass 3.65 cps/mA/microgram (.32)

TABLE 3

Calculated Sample Masses From Compton Scatter Intensity

| Sample | Mass | Calculated Mass | |
| --- | --- | --- | --- |
| M104dE | 12.1 | 13.8 | (.12) |
|  |  | 13.5 | (.12) |
| M104eF | 23.3 | 24.3 | (.16) |
| M104fG | 8.36 | 9.40 | (.11) |
| M106dA | 2.76 | 2.59 | (.06) |
|  |  | 2.55 | (.06) |
| M106eB | 1.83 | 2.22 | (.06) |
| M106fC | 3.43 | 3.52 | (.07) |
| M108dM | 27.4 | 25.0 | (.16) |
|  |  | 24.9 | (.16) |
| M108eS | 39.9 | 36.4 | (.19) |
| M108fH | 53.2 | 48.1 | (.21) |
| M112dD | 5.43 | 5.33 | (.08) |
| M112eI | 3.30 | 3.74 | (.08) |
| M112fX | 7.17 | 7.35 | (.09) |

TABLE 3-continued

Calculated Sample Masses From Compton Scatter Intensity

| Sample | Mass | Calculated Mass | |
|---|---|---|---|
| M114dU | 5.24 | 5.06 | (.08) |
| M114fp | 9.13 | 8.66 | (.10) |

TABLE 4

SAMPLES ON 1.5 MICRON MYLAR
TABLE 1

Materials Used

| Names | Dissolved Solids (ppm) (at 140 deg F.) | |
|---|---|---|
| USGS M104 | 629 | (3) |
| USGS M106 | 103 | (4) |
| USGS M108 | 1457 | (6) |
| USGS M112 | 112 | (3) |
| USGS M114 | 211 | (2) |

Samples Analyzed

| Label | Net Liquid Sample (milligrams) | Calculated Dried Mass (micrograms) |
|---|---|---|
| M104a | 21.6 | 13.6 |
| M104b | 24.9 | 15.7 |
| M104c | 20.3 | 12.8 |
| M106a | 46.8 | 4.82 |
| M106b | 46.1 | 4.75 |
| M106c | 40.2 | 4.14 |
| M108a | 21.4 | 31.2 |
| M108b | 17.9 | 26.1 |
| M108c | 15.1 | 22.0 |
| M112a | 56.5 | 6.33 |
| M112b | 35.5 | 3.98 |
| M112c | 40.7 | 4.56 |
| M114a | 46.3 | 9.77 |
| M114b | 25.9 | 5.46 |
| M114c | 21.7 | 4.58 |

TABLE 5

TYPICAL SPECTRAL DATA
(150 sec acquire time, 50 kV, 2.0 mA, vacuum)

| Sample | Mass | "Compton" Total | Net cps | "Rayleigh" Total | Net cps |
|---|---|---|---|---|---|
| M104a | 13.6 | 1126 | 104 | 422 | 70.0 |
|  |  | 1120 | 98.0 | 417 | 65.0 |
| M108a | 31.2 | 1235 | 188 | 508 | 148 |
|  |  | 1228 | 181 | 511 | 151 |
| M112a | 6.33 | 1007 | 50.0 | 370 | 38.0 |
|  |  | 1002 | 45.0 | 370 | 38.0 |
|  |  | 1015 | 58.0 | 374 | 42.0 |

TABLE 6

Calculated Sample Masses From Compton Scatter Intensity
(Conversion Factor = 3.65 cps/mA/microgram)

| Sample | Mass | Calculated Mass | |
|---|---|---|---|
| M104a | 13.6 | 14.3 | (.52) |
|  |  | 13.4 | (.52) |
| M104b | 15.7 | 14.9 | (.51) |
|  |  | 13.3 | (.51) |
| M104c | 12.8 | 12.3 | (.51) |
|  |  | 11.9 | (.51) |
| M106a | 4.82 | 5.07 | (.50) |
|  |  | 3.56 | (.50) |
| M106b | 4.75 | 4.11 | (.50) |
|  |  | 2.88 | (.50) |
| M106c | 4.14 | 3.56 | (.52) |
|  |  | 3.15 | (.52) |
| M108a | 31.2 | 25.8 | (.53) |
|  |  | 24.8 | (.53) |
| M108b | 26.1 | 21.4 | (.52) |
|  |  | 20.6 | (.52) |
| M108c | 22.0 | 18.0 | (.52) |
|  |  | 16.7 | (.51) |
| M112a | 6.33 | 6.85 | (.50) |

TABLE 6-continued

Calculated Sample Masses From Compton Scatter Intensity
(Conversion Factor = 3.65 cps/mA/microgram)

| Sample | Mass | Calculated Mass | |
|---|---|---|---|
|  |  | 6.16 | (.50) |
|  |  | 7.95 | (.50) |
| M112b | 3.98 | 5.34 | (.51) |
|  |  | 4.79 | (.51) |
|  |  | 3.97 | (.51) |
| M112c | 4.56 | 6.99 | (.49) |
|  |  | 8.08 | (.49) |
|  |  | 7.26 | (.49) |
| M114a | 9.77 | 8.77 | (.51) |
|  |  | 6.03 | (.51) |
| M114b | 5.46 | 7.67 | (.51) |
|  |  | 6.03 | (.51) |
| M114c | 4.58 | 5.07 | (.50) |
|  |  | 4.93 | (.50) |

What is claimed is:

1. A device for measuring mass of very low mass samples comprising:
    a radiation generation and detection assembly, the assembly including a radiation source for generating X-ray radiation which is to be directed to a sample, a first collimator which collimates radiation generated by the radiation source to form incident radiation, a second collimator which collimates emissive and scattered radiation from the sample, a detector for detecting Compton scattered radiation Ic and Rayleigh scattered radiation Ir from the sample, the detector having sufficient spectral resolution to identify the scattered radiation of interest, and an evacuated chamber through which said incident and scattered radiation traverse;
    means for supporting a sample positioned to allow the sample to intercept the incident radiation and produce the scattered radiation of interest; and
    means for determining the mass M according to the relationship $$M = Ic(1.0 + 0.2 * Ir/Ic)^2).$$

2. A device in accordance with claim 1, the device further including a power source for operating the radiation source, means for building up a spectrum of scattered radiation from a sample form the radiation detected by the detector, means for preventing stray radiation which does not hit the sample from entering the detector.

3. A device in accordance with claim 2 wherein the radiation source is an x-ray tube and the incident and scattered radiation includes x-rays.

4. A device in accordance with claim 1 wherein the means for supporting the sample is a film having an effective irradiated mass ranging from about 1 microgram to about 500 micrograms.

5. A device in accordance with claim 4 wherein the film is selected from the group consisting of formvar and mylar.

6. A device in accordance with claim 5 wherein the film is supported by a 35 mm slide frame.

7. A method for measuring the absolute mass of a sample comprising:
    measuring the Compton scattered radiation and Rayleigh scattered radiation from a sample support having impinging thereon incident X-ray radiation generated from a radiation source;

measuring the Compton scattered radiation and Rayleigh scattered radiation from the sample support and sample on the sample support having impinging thereon the incident X-ray radiation from the radiation source, the sample having a mass ranging from about 10 nanograms to about 0.1 grams;

determining the net Compton (Ic) and Rayleigh (Ir) scattered radiation from the sample by subtracting the Compton and Rayleigh scattered radiation from the sample support from the Compton and Rayleigh scattered radiation from the sample support and sample and converting the net Compton (Ic) and Rayleigh (Ir) scattered radiation from the sample into mass units according to the relationship $$\text{mass} = CC*Ic(1.0 + 0.2*(Ir/Ic)^2)$$

where CC is an empirically derived version of the calibration constant to correct for effects due to varying sample composition and absorption of x-ray radiation.

8. The method according to claim 9, including the steps of:

measuring area (a) of the sample;

obtaining an estimate rho*t according to the relationship rho*t = (absolute mass)/a;

obtaining an estimate mu/rho according to the relationship $$mu/rho = 8.4(Ir/Ic)^2$$

correcting the measured Compton scattered radiation (Ic) and Rayleigh scattered radiation (Ir) to obtain corrected values $Ic'$ and $Ir'$, respectively according to the relationship $$Ic' = Ic * e^{-(mu/rho)*rho*t} \text{ and}$$

$$Ir' = Ic * e^{-(mu/rho)*rho*t};$$

determining a corrected absolute mass according to the relationship $$\text{corrected absolute mass} = CC*Ic'*(1.0 + 2.0*(Ir'/Ic')^2).$$

* * * * *